United States Patent [19]
Bell

[11] Patent Number: 5,434,996
[45] Date of Patent: Jul. 18, 1995

[54] SYNCHRONOUS/ASYNCHRONOUS CLOCK NET WITH AUTOSENSE

[75] Inventor: D. Michael Bell, Beaverton, Oreg.

[73] Assignee: Intel Corporation, Santa Clara, Calif.

[21] Appl. No.: 175,196

[22] Filed: Dec. 28, 1993

[51] Int. Cl.[6] .......................... G06F 13/00; H04L 7/02
[52] U.S. Cl. ..................................... 395/550; 395/325;
395/500; 395/800; 395/725; 395/275; 395/250;
364/231; 364/232.9; 364/239.7; 364/247.4;
364/270.5; 364/DIG. 1
[58] Field of Search ................. 395/325, 550; 375/110,
375/107; 364/DIG. I, DIG. II

[56] References Cited

U.S. PATENT DOCUMENTS

| | | | |
|---|---|---|---|
| 4,785,469 | 11/1988 | Joshi et al. | 375/110 |
| 4,916,717 | 4/1990 | Sackman, III et al. | 375/107 |
| 5,191,657 | 3/1993 | Ludwig et al. | 395/325 |
| 5,339,395 | 8/1994 | Pickett et al. | 395/325 |

OTHER PUBLICATIONS

"The Metaflow Architecture", Val Popescu, Merle Schults, John Spracklen, Gary Gibson, Bruce Lightner and David Isaman, IEEE Micro, Jun. 1991 (pp. 10–13, 63–73).

Primary Examiner—Kevin A. Kriess
Assistant Examiner—Majid A. Banankhah
Attorney, Agent, or Firm—Blakely, Sokoloff Taylor & Zafman

[57] ABSTRACT

A circuit within a bus bridge operating in a first clock domain and a second clock domain, wherein the circuit allows data, address or any other information to be reliably transferred between the first and second clock domains regardless whether or not an internal bus clock of the second clock domain is operating in a synchronous or asynchronous fashion, while the circuit still minimizes clock skew between the internal bus clocks of both clock domains as well as any corresponding external bus clocks.

34 Claims, 13 Drawing Sheets

NORMAL SYNCHRONOUS MODE

L = Launch
C = Capture

HIGH SPEED SYNCHRONOUS MODE

L = Launch
C = Capture

SYNCHRONOUS/ASYNCHRONOUS CLOCK NET WITH AUTOSENSE

BACKGROUND OF THE INVENTION

1. Field of the Invention

The present invention relates to an apparatus and method for minimizing clock skew. More particularly, the present invention relates to a circuit within a bus bridge having at least first and second clock domains, wherein the circuit allows information to be reliably transferred between the first and second clock domains regardless whether or not an internal bus clock of the second clock domain is synchronized with an internal bus clock of the first domain, while still minimizes clock skew between each of the internal bus clocks as well as any corresponding external bus clocks.

2. Background of the Invention

It is commonly known that several clock domains (i.e., portions of a system using a particular clocking frequency) can be used throughout a computer system. These clock domains allow various components to operate at their most efficient level. A bus bridge is an apparatus which enables any information, particularly data or address information (hereinafter collectively referred to as "data/address information") to be transferred from a first bus to a second bus, wherein both the first and second buses utilize unique protocol i.e., timing and read/write commands. The data/address information can be transferred in a bi-directional manner, namely, from the first bus to the second bus and from the second bus to the first bus.

In conventional bus bridges, it is required that the first and second buses operate at identical or harmonically related frequencies. According to FIG. 1, a conventional bus bridge 1 is typically interposed between a faster, central processing unit ("CPU") bus 2 and a slower, peripheral component interconnect "CPU" bus 3. These buses are normally incorporated within a computer system 4 in which the CPU bus 2 enables communication between a plurality of processing devices 5a–5n operating at a first predetermined frequency and the PCI bus 3 enables communication between a plurality of peripheral devices 8a–8n (e.g., a video adapter 8a, hard disk drive controller 8n and the like) operating at a second predetermined frequency.

As shown in FIG. 1, the plurality of processing devices 5a–5n are clocked by a first external clock generator 6, which generates multiple copies of a CPU clock signal having the first predetermined frequency. These copies of the CPU clock signal are then utilized by the plurality of processing devices 5a–5n, in addition to any other device coupled to the CPU bus 2, including the conventional bus bridge 1. However, no external clock generator is needed in order to obtain a PCI clock signal having the second predetermined frequency. The reason being that the plurality of processing devices 5a–5n always operates at speeds greater than any of the plurality of peripheral devices 8a–8n. Thus, the first frequency is greater than the second frequency, allowing the CPU clock signal to be used to generate the PCI clock signal.

The PCI clock signal is obtained by inputting the CPU clock signal through deskewing logic and a "divide-by-n" divider incorporated with the bus bridge 1, where "n" is a whole number greater than zero. As a result, the second frequency is always harmonically related to the first frequency. The PCI clock signal is then inputted into an external clock driver 7, which generates multiple copies of the PCI clock signal to be used by every device operating on the PCI bus 3.

In the conventional bus bridge 1, deskewing is accomplished by employing the external clock driver 7 into a feedback relationship with the bus bridge 1. The feedback relationship consists of inputting one copy of the PCI clock signal back into the bus bridge 1 and then using a conventional phase-locked loop to deskew and to align the clock edges of the PCI clock signal with the CPU clock signal bridge clocking.

One problem associated with the conventional bus bridge is that it is not able to support the CPU clock signal.

Another problem associated with the conventional bus bridge is that it imposed limitations on system design because the second frequency used by the PCI devices is required to be harmonically related to the first frequency used by the processing devices.

Yet another problem is that the conventional bus bridge imposes performance limitations since the PCI bus clock is required to be harmonically related to the CPU bus clock. For example, if the maximum CPU clock frequency is sixty megahertz (60 MHz) and the maximum PCI clock frequency is twenty-three megahertz (23 MHz), the conventional bus bridge would require a complex combination of dividers, multipliers and the like in order to enable the CPU and PCI clocks to function at their maximum levels. Such complexity could cause delay problems.

In addition to developing a clocking relationship between the clock domains, there exists an equally important need to ensure that data/address information is reliably transferred between clock domains. Normally, transferring data/address information from the first bus to the second bus is a four-step process. The first step is transferring the data/address information into an intermediate buffering device (e.g., a FIFO). Then, notifying interface logic for the second bus that the data/address information has been placed into the buffering device. Such notification is accomplished by a conventional synchronizer being a pair of cascaded flip-flops clocked at the second bus frequency. Next, the interface logic of the second bus obtains the data/address information from the intermediate buffering device. Finally, the interface logic of the second bus notifies interface logic of the first bus that the buffering device is now empty and available. However, there is no protocol for transferring data/address information in bus circuit supporting both synchronous and asynchronous operations.

BRIEF SUMMARY OF THE INVENTION

In light of the foregoing, it is apparent that there exists a need for an apparatus supporting two bus clocks internal to the apparatus which operate synchronous and asynchronous to each other while still minimizing clock skew between the internal bus clocks as well as their corresponding external bus clocks. Moreover, the apparatus must contain transmission circuitry designed in such a fashion that data/address information can be reliably transferred between clock domains regardless whether the internal bus clocks are synchronous or not.

It is therefore an object of the present invention to provide a bridge circuit having at least two clock domains in which both clock domains are being clocked by harmonically or non-harmonically related frequencies.

It is another object of the present invention to provide greater designer flexibility of computer systems.

It is another object of the present invention to enhance system performance by allowing at least one bus clock to operate in an asynchronous manner.

It is yet another object of the present invention to mitigate clock skew between the external bus clock and the internal clock tree in both synchronous and asynchronous operation.

It is an object of the present invention to enable an input/output CI/O) pad to sense an operating mode of the bus bridge as well as to be used as a clock driver output in order to reduce pin requirements.

It is another object of the present invention to provide tag units to synchronize data transfers between two clock domains with minimal synchronized latency by enabling the tag units to be set in one clock domain and cleared in the other domain.

Normally incorporated within a computer system, the apparatus comprises a circuit including two domains, referred to as a first clock domain and a second clock domain. The first and second clock domains are coupled to a first and second buses, respectively. The first bus is at least as faster or faster than the second bus, wherein the first bus is typically a CPU bus and the second bus is a PCI bus. For the remainder of the application, the faster bus and its associated signals shall be referred to as the "CPU" bus and CPU clock signals and the slower bus and its associated signals shall be referred to as the "PCI" bus and "PCI" signals, however, it is contemplated that any buses could be employed as long as the first bus is as fast as the second bus.

The first clock domain includes a device, normally a phase-locked loop, to substantially deskew an external CPU clock signal in relation to an internal CPU clock signal. Then, the substantially deskewed clock signal is inputted into the second clock domain, but may undergo frequency division in order to approximate the divided, substantially deskewed clock signal to a desired PCI clock signal.

The second clock domain determines whether synchronous or asynchronous operations are desired (i.e., whether synchronous or asynchronous mode is selected). The second clock domain includes a mode detection circuit which monitors voltage level on a I/C) pad of the bridg.e wherein such voltage dictates which of the two modes is desired. The second clock domain further includes a clock source selector, an internal PCI clock tree, a second phased-lock loop having reversible inputs, which are coupled together with the mode detection circuit other circuitry in order to enable synchronous and asynchronous generation of the PCI clock frequency, as explained in more detail in the detailed description.

The above clocking scheme is used in to provide clock signals to transmission circuitry in order to achieve efficient and highly reliable data/address transfers between the two clock domains when operating in either synchronous or asynchronous mode. Although conventional tag units and synchronizers are designed to solely support synchronous operations, the tag units and synchronizers discussed herein support both synchronous and asynchronous operations.

BRIEF DESCRIPTION OF THE DRAWINGS

The objects, features and advantages of the present invention will become apparent from the following detailed description of the present invention in which.

DETAILED DESCRIPTION OF THE INVENTION

A bus bridge circuit and method are described herein which are useful for providing reliable data/address transfer between two buses, even though a bus clock in the second clock domain may operate in an asynchronous manner. In the following detailed description, numerous specific details are set forth, such as, for example, specific circuit components related to data/address transfers and clocking to support such data/address transfers. However, it is apparent to one skilled in the art, that the present invention may be practiced without incorporating the specific components set forth. In order to more clearly explain the present invention, the clocking circuitry and data/address transmission circuitry of the present invention will be discussed in two separate sections.

A. Clocking Circuitry

Figure 1:
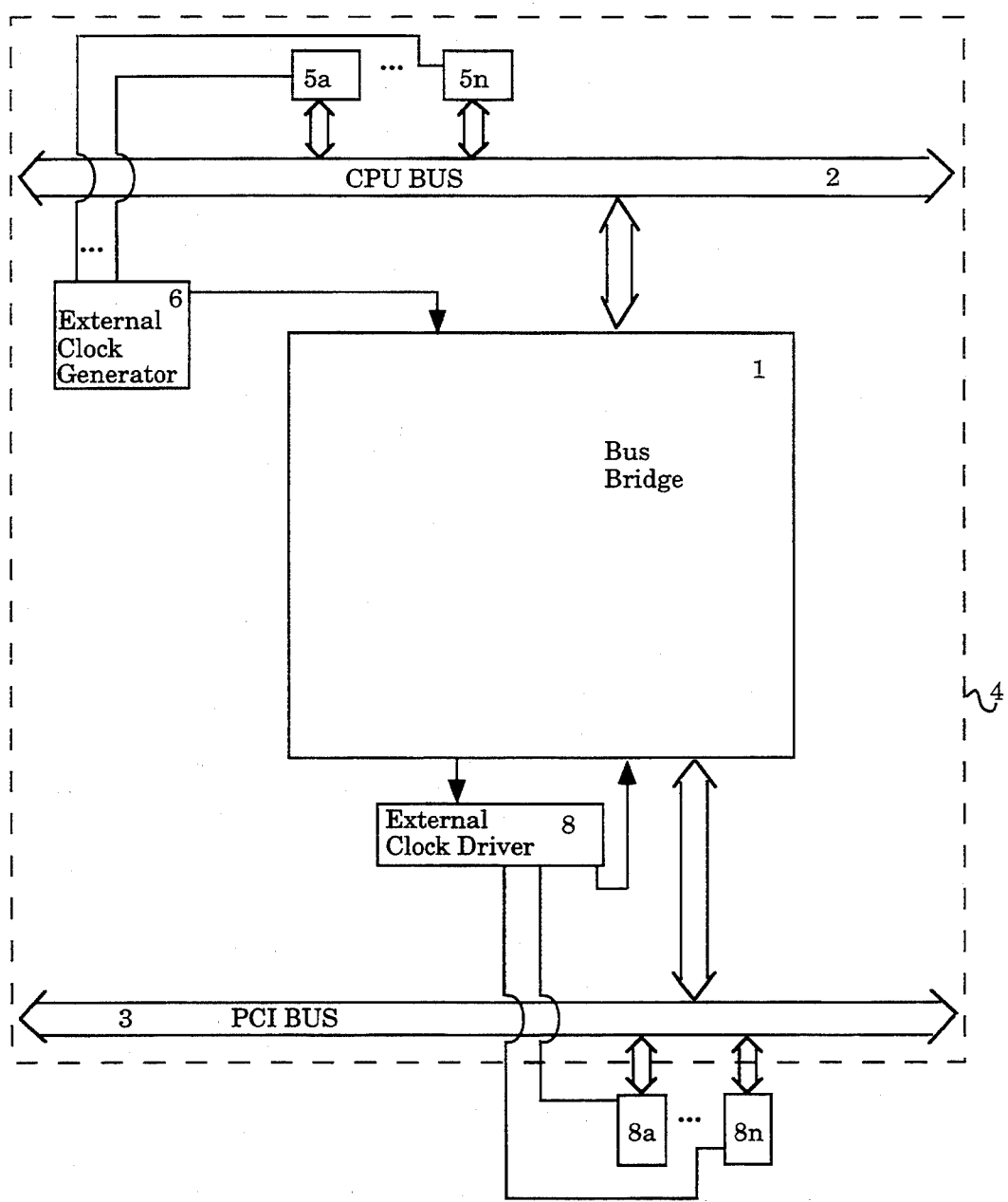
FIG. 1 is a block diagram of a conventional bus bridge clocking circuit coupling a first and second bus, wherein the circuit derives a clock for the second bus from clock of the first bus.

As previously discussed herein, FIG. 1 illustrates the conventional bus bridge 1 coupled to the CPU bus 2 being clocked at the first frequency and the PCI bus 3 being clocked at the second frequency. The second frequency is obtained by dividing the first frequency by "n" "Cn" equal to a whole number greater than one), thereby requiring the clocking frequency of the PCI bus to be harmonically related to the first frequency.

Figure 2:
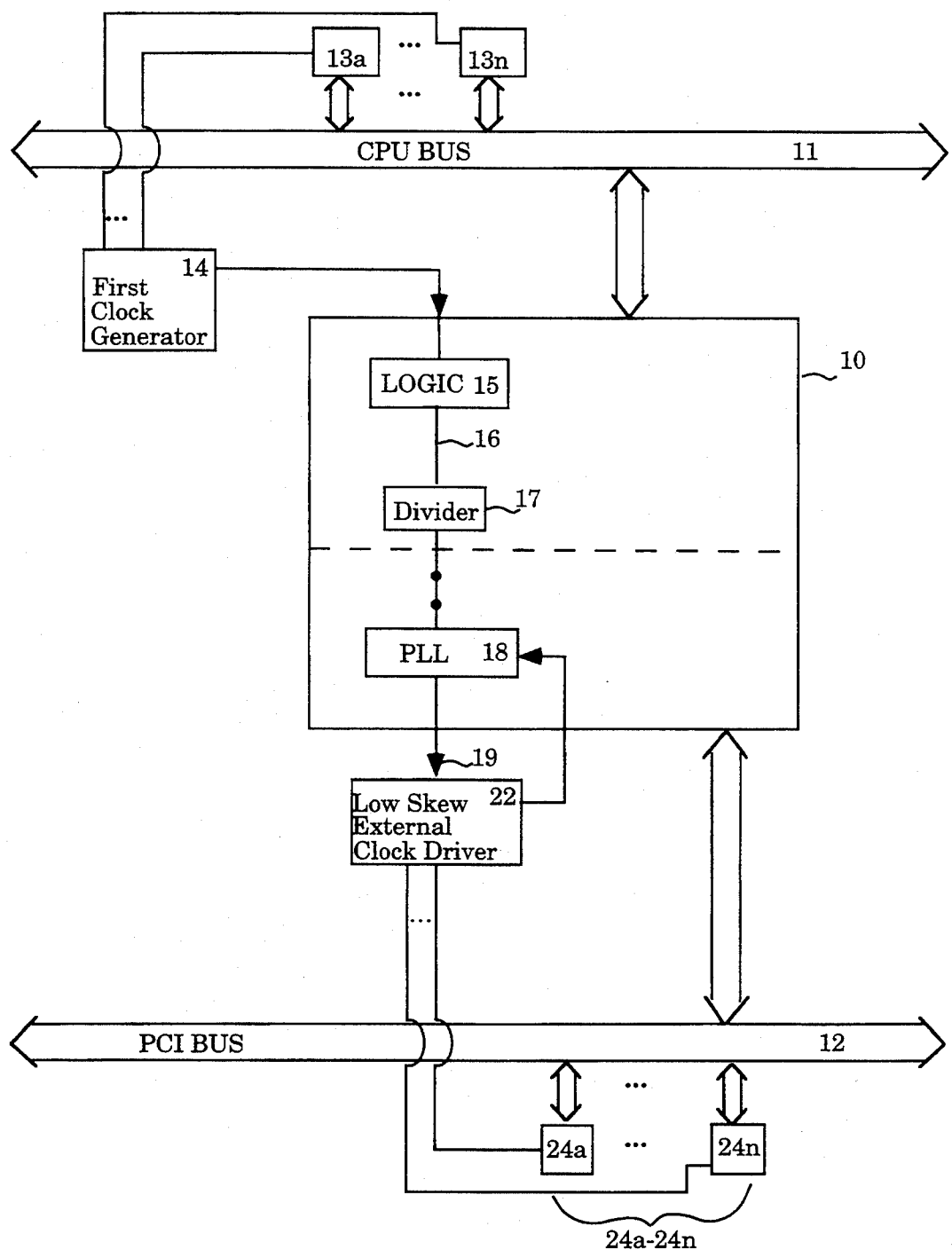
FIG. 2 is a block diagram of a multi-bus system incorporating the present invention operating in synchronous mode.

FIG. 2 illustrates one embodiment of the present invention incorporated within a multi-bus system, preferably within a computer system. Although the present invention describes a bridge circuit which, inter alia, generates deskewed internal CPU and PCI bus clocks, it should be borne in mind that the present invention may find a wide application for generating any deskewed internal bus clocks.

The present invention comprises a bridge circuit 10 coupled between a CPU bus 11 and PCI bus 12. Similar to the conventional bridge scheme shown in FIG. 1, a plurality of processing devices 13a–13n are coupled together by the CPU bus 11 operating at an external CPU clock frequency, while a plurality of peripheral devices 24a–24n on the PCI bus 12 operate at an external PCI clock frequency.

A first external clock generator 14 is coupled to each of the plurality of processing devices 13a–13n and the bus bridge circuit 10 in order to clock these devices and circuit at the external CPU clock frequency. The external CPU clock signal generated by the first external clock generator 14 is inputted into a combination of conventional logic 15, including a conventional phase-locked loop, in order to minimize skew with respect to an internal CPU clock. As a result, a substantially deskewed CPU clock signal is produced.

The substantially deskewed CPU clock signal is inputted into a divider 17 through a PLL output signal line 16 in order to form a divided frequency clock signal synchronized with and harmonically related to the substantially deskewed CPU clock signal. The divided signal is then selectively inputted into a second phase-locked loop (hereinafter referred to as the "second PLL") 18, resulting in a first clocking signal 19.

If the bus bridge circuit 10 is operating in a synchronous mode, the first clocking signal 19 is outputted from the circuit 10 to be inputted into a low skew external clock driver 22. The low skew external clock driver 22 generates multiple copies of the clocking signal 19 to be inputted into the plurality of peripheral devices 24a–24n and one copy of the clocking signal 19 being returned to the second PLL 18 of the bus bridge circuit 10 as a feedback signal for deskewing purposes.

Figure 3:
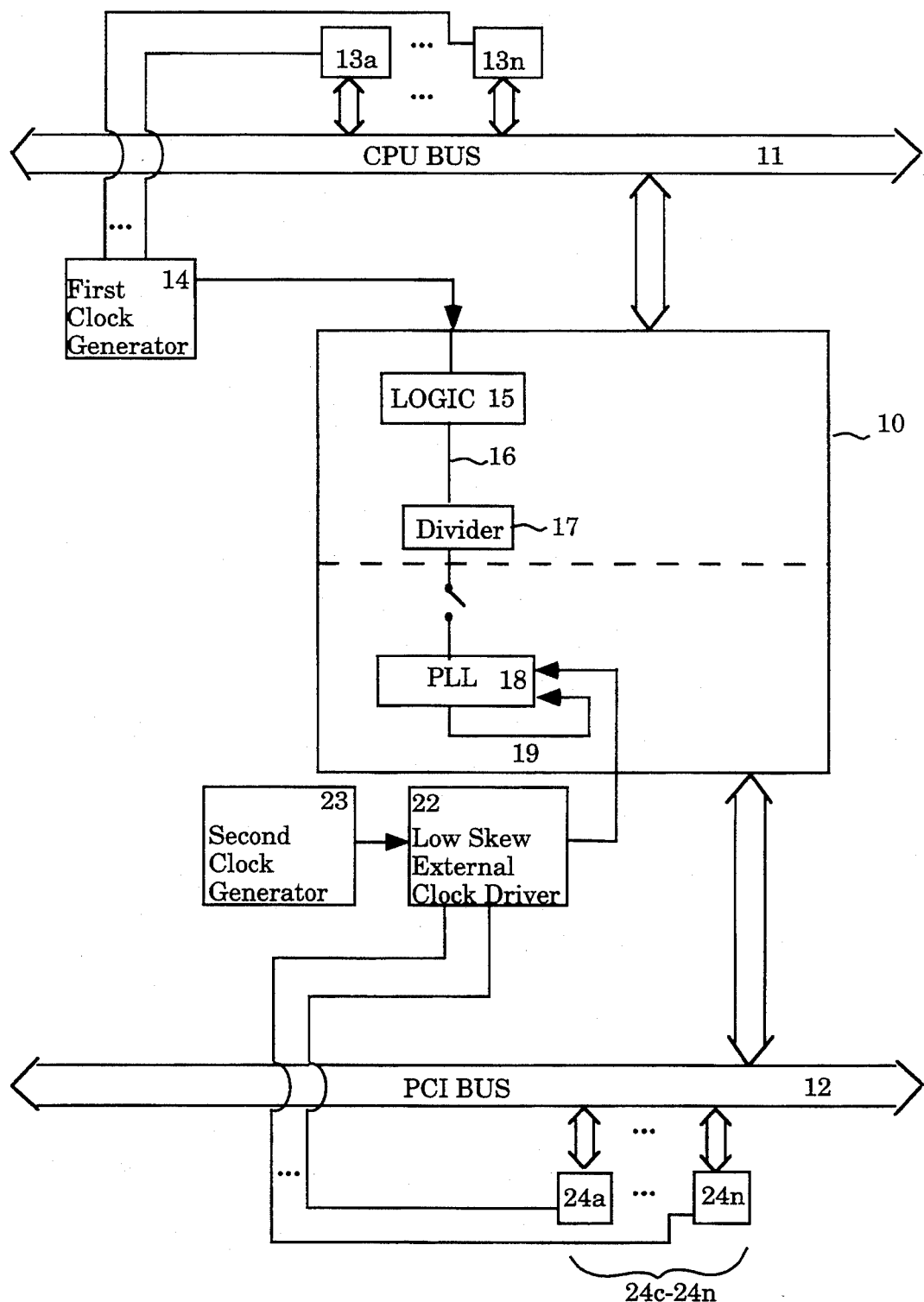
FIG. 3 is a block diagram of a multi-bus system incorporating the present invention operating in asynchronous mode.

Alternatively, if an asynchronous operation is desired, as shown in FIG. 3, the first clock signal 19 is used as a feedback signal within the bus bridge circuit 10 itself. A second external clock generator 23 is coupled to the low skew external clock driver 22 in order to supply the plurality of peripheral devices 24a–24n with a PCI clock signal, as well as provide one copy of the PCI clock signal to the bridge circuit 10 for use as a reference signal for generation of the first clock signal 19. Of course, the divided frequency clock signal is disconnected from the second PLL since its not being used by the second PLL 18 when operating in the asynchronous mode.

Figure 4:
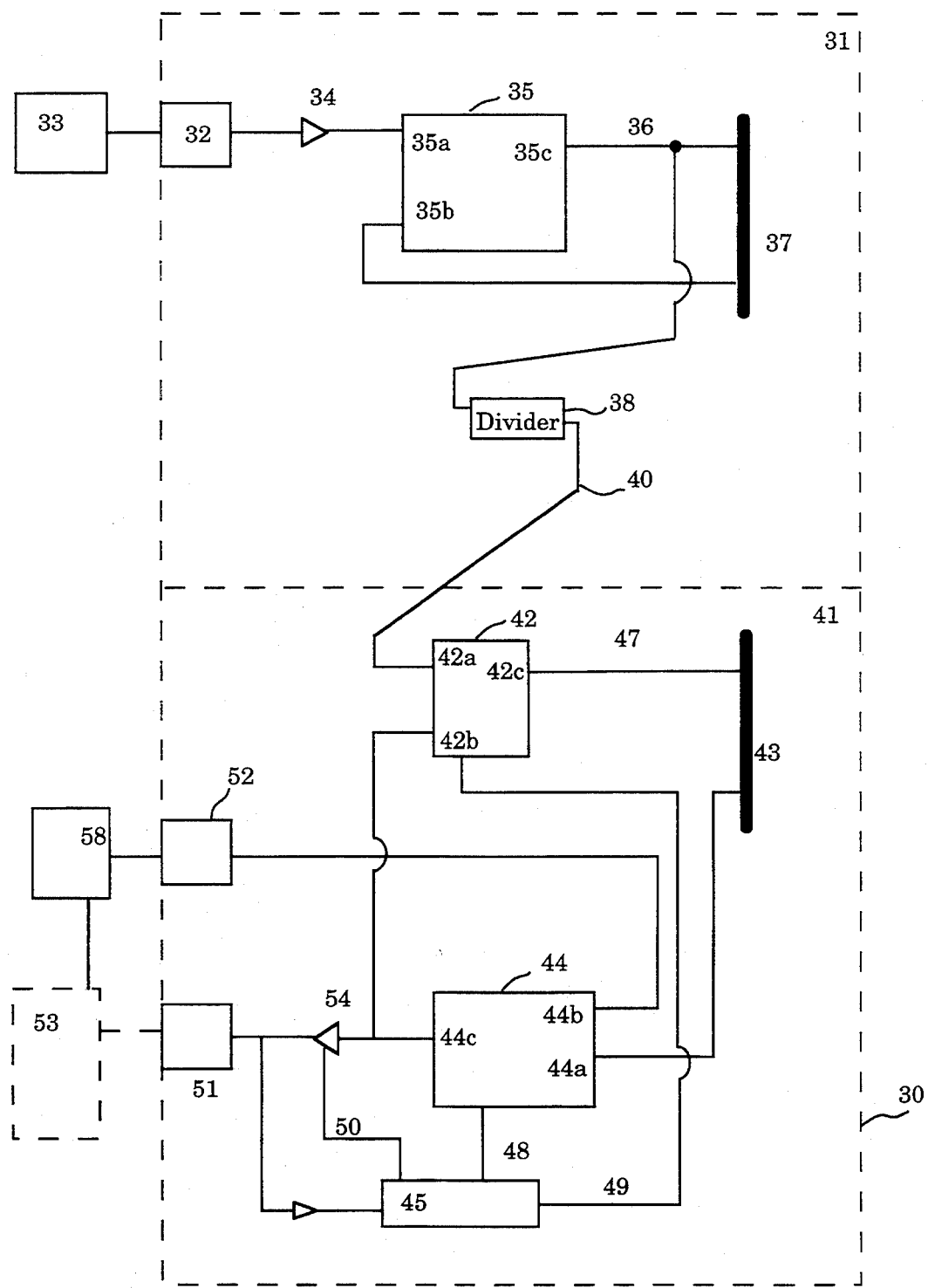
FIG. 4 is a circuit diagram of the embodiment illustrated in FIGS. 2-3.

Referring to FIG. 4, it illustrates a more detailed block diagram of the present invention. In FIG. 4, the bus bridge circuit 30 comprises a CPU clock domain 31 and a PCI clock domain 41, both of which are coupled together through a frequency synchronizing signal line 40.

The CPU clock domain 31 includes a CPU_CLK pad 32 coupled to an external CPU clock generator 33. The external CPU clock generator 33 generates multiple external CPU clock signals, each of which having the external CPU clock frequency. The external CPU clock generator 33 inputs a copy of the external CPU clock signal into the CPU clock domain 31 through the CPU_CLK pad 32. The CPU_CLK pad 32 is coupled to an input buffer 34 in order to drive the external CPU clock signal into a first input 35a of a first PLL 35.

The first PLL 35, as all PLLs, is a conventional feedback component. In the present invention, the first PLL 35 receives the external CPU clock signal as a reference signal through a first input 35a and generates a first PLL clocking signal through a first PLL output signal line 36. The frequency of the first PLL clocking signal is based on the frequency of the external CPU clock signal.

In this circuit, the first PLL 35 is coupled to an internal CPU clock tree 37 through the first PLL output signal line 36, in which the internal CPU clock tree 37 provides a first PLL feedback signal inputted into a second input 35b of the first PLL 35. The first PLL feedback signal is equivalent in frequency to the first PLL clocking signal with slight time delays.

In general, clock trees such as the CPU clock tree 37 as well as the PCI clock tree 43 comprise a plurality of buffers which are arranged to drive different synchronous components, such as flip-flops, as well as to promote equal time delays among the flip-flops (i.e., a clock edge of each flip-flop is activated simultaneously in order to make the time delays constant). In the CPU clock domain, the combination of the first PLL 35 and the CPU clock tree 37 removes skew between the first PLL clocking signal (i.e., the external CPU clock) and the first PLL feedback signal (i.e., an internal CPU clock signal), resulting in the first PLL feedback signal being equal in frequency and phase with the first PLL clocking signal.

Besides being coupled to the CPU clock tree 37 for supplying a clock and deskewing purposes, the first PLL clocking signal is also coupled to a "divide-by-n" divider 38 in order to create a divided frequency clock signal being "n" times slower than the first PLL clocking signal. The divided frequency clock signal is divided in such a manner as to approximate a desired frequency for the external PCI bus clock. The divided frequency clock signal is then inputted into the PCI clock domain 41 through the frequency synchronizing signal line 40.

The PCI clock domain 41 comprises a clock source selector 42, the PCI clock tree 43, a second PLL 44 being reversible and a mode detection circuit 45 coupled together with other circuitry in order to enable synchronous and asynchronous generation of the PCI clock frequency.

As previously indicated, frequency synchronizing signal line 40 is coupled to a first input 42a of the clock source selector 42. The clock source selector 42 includes the first and a second input 42a and 42b and one output 42c. The second input 42b is coupled to a second PLL output signal line 46 while the output 42c is coupled to an PCI clock tree 43 through a clock source selector output signal line 47. The clock source selector 42 operates in a manner similar to a conventional multiplexor by outputting a signal identical to one of its two inputted signals depending on which signal is selected by the mode detection circuit 45. However, the clock source selector 42 also contains several drivers for assistance in driving the selected output signal into the PCI clock tree 43.

The PCI clock tree 43 receives the selected output signal and uses the selected output signal as a clock. The PCI clock tree 43 is coupled to a first input 44a of the second PLL 44 in order to input a PCI clock output signal being equal to a delayed selected output signal. Similar to the first PLL 35 within the CPU clock domain 31, the second PLL 44 includes a first and second input 44a and 44b and a single output 44c. The second input 44b is coupled to a PCI_CLK_IN pad 52 which receives a signal from an external clock source 53 transmitted through an external low skew clock driver 58 in order to provide multiple low skew copies of the external clock source 53. The nature of the external clock source 53 depends on whether synchronous or asynchronous operations are desired. Contrary to the first PLL, the pair of inputs 44a and 44b of the second PLL 44 are reversible, namely, both inputs 44a and 44b are configurable to receive either a reference signal or a feedback signal. Such configuration is accomplished by incorporating a pair of multiplexors within the second PLL 44.

Figure 5:
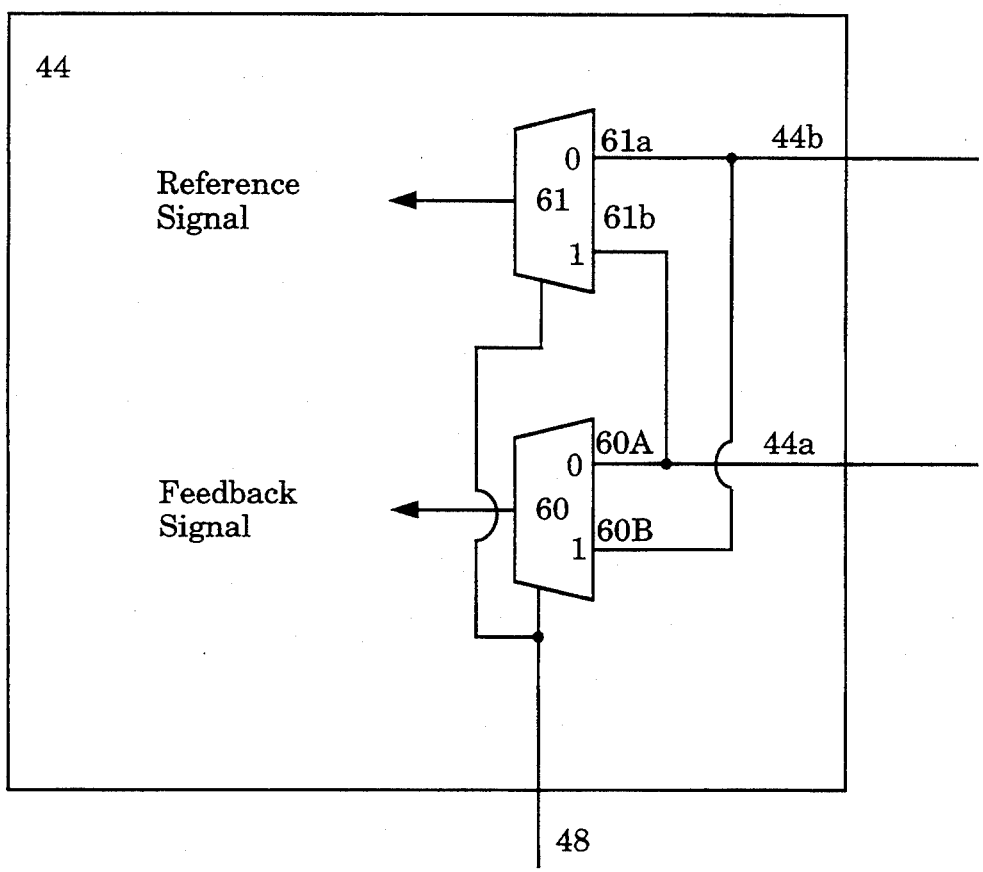
FIG. 5 is a more detailed circuit diagram of a reversible phase-locked loop implemented in the present invention.

As shown in FIG. 5, the second PLL 44 comprises two dual input multiplexors 60 and 61 sharing a common select signal line 48. The multiplexors are cross-coupled such that a signal transmitted into the first input 44a of the second PLL 44 is simultaneously transmitted into a first input 60a of the first multiplexor 60 and a second input 61b of the second multiplexor 61. In addition, a signal transmitted into the second input 44b of the second PLL 44 is then transmitted into a second input 60b of the first multiplexor 60 and a first input 61a of the second multiplexor 61. As a result, an active select signal line 48 selects the first input 44a of the second PLL 44 to be a feedback input, while the second input 44b to be a reference signal input.

Referring back to FIG. 4, the output 44c of the second PLL 44 is coupled to the clock source selector 42 and a tri-state gate 54. The tri-state gate 54 is enabled by the mode detection circuit 45 in order to drive an output signal into a PCI_CLK pad 51 of the bus bridge circuit 30. The PCI_CLK pad 51 is monitored by the mode detection circuit 45 in order to determine whether to activate certain controls, among which is to enable or disable the tri-state gate 54.

Figure 6:
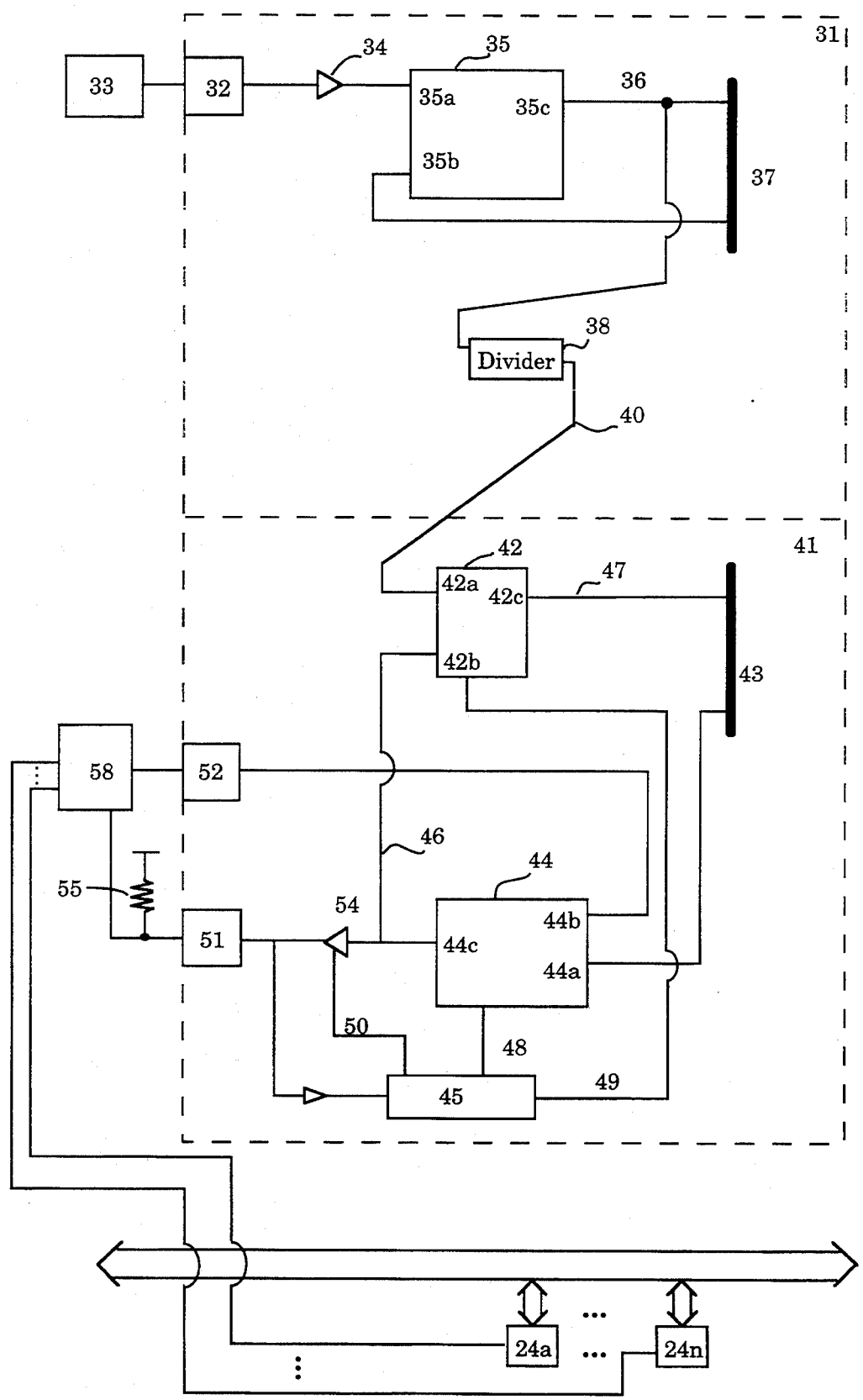
FIG. 6 is a more detailed circuit diagram of the embodiment in FIG. 4 operating in synchronous mode.
Figure 7:
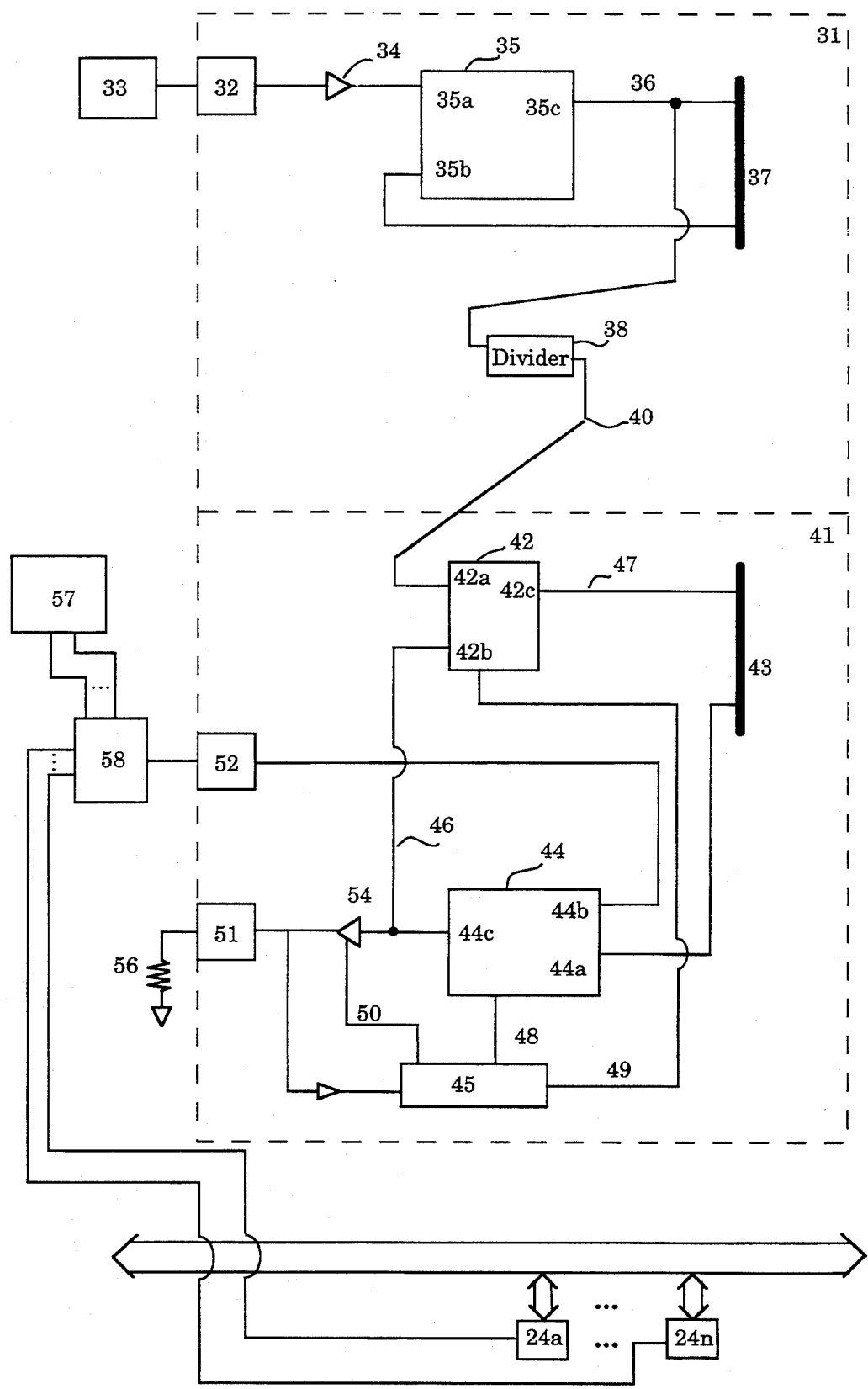
FIG. 7 a more detailed circuit diagram of the embodiment in FIG. 4 operating in an asynchronous mode.

Referring now to FIGS. 6 and 7, the mode detection circuit 45 is a combination of conventional logic used to determine at initialization or after a reset, whether synchronous or asynchronous operations are desired. For example, one way to ascertain which operation is desired is to monitor voltage level on an I/O pad (e.g., the PCI_CLK 51 pad). However, it is contemplated that there exist many other ways to ascertain the nature of the desired operation. The presence of a pull-up resistor 55 (i.e., a "high" voltage level) indicates that synchronous operations are desired while the presence of a pull-down resistor 56 (i.e., a "low" voltage level) indicates that asynchronous operations are desired. The mode detection circuit 45 is coupled to the second PLL 44, the clock source selector 42 and the tri-state gate 54 through a PLL second select line 48, a clock source select line 49 and a tri-state gate enable line 50, respectively. These control signals are activated when asynchronous operations are desired.

In an inactive state, (i.e., when a pull-up resister on the PCI_CLK pad 51 is detected indicating synchronous operations), the PLL input select line 48 enables the first input 44a to be designated as the input of the reference signal and the second input 44b is reserved for the feedback signals. However, when the input select line 48 is activated, the second PLL select line 48 switches the role of the inputs 44a and 44b so that the second input 44b is designated for the reference signal while the first input 44a is designated for a feedback signal.

With reference to the clock source select line 49, when activated, it selects the divided frequency clock signal on the frequency synchronizing signal line 40 to be an output of the clock source selector 42 and thereafter, to be used as the reference signal for the second PLL 44. However, when inactive an output signal 44c of the second PLL 44, which propagates through the second PLL output signal line 46, is used as a feedback signal of the second PLL 44.

With respect to the tri-state gate enable signal 50, it is an "active low" signal. When the tri-state gate enable signal is inactive ("high"), it enables a tri-state gate 54 so that the output of the second PLL 44 is capable of being transmitted externally from the bus bridge circuit 30 from the PCI_CLK pad 51. When active though, the second PLL 44 output signal is incapable of being outputted external to the bus bridge circuit 30. It is contemplated that any logic gate or combination thereof having selectable driving features could be used in lieu of the tri-state gate 54. The operations of the bus bridge circuit in synchronous and asynchronous operations are shown in FIGS. 6 and 7, respectively.

In FIG. 6, in order to operate in synchronous mode, a pull-up resistor 55 is externally coupled to the PCI_CLK pad 51. Upon detection of the presence of the pull-up resistor 55 on the PCI_CLK pad 51, the mode detection circuit 45 deactivates the second PLL input select line 48, the clock source select line 49 and the tri-state gate enable line 50. Thus, the output of the second PLL 44 is outputted directly from the second PLL 44 output signal line to the PCI_CLK pad 51. The PCI_CLK pad 51 is coupled to the external low skew clock driver 58 so that copies of the clocking signal can be distributed to peripheral devices on the PCI bus. One copy of the clocking signal is fed back into the PCI_CLK_IN pad 52 so as to operate as a feedback signal line.

With respect to the operation in an asynchronous mode as shown in FIG. 7, the pull-down resistor 56 is coupled to the PCI_CLK pad 51. As a result, the mode detection circuit 45 determines that it is desirous for the clocks to operate in an asynchronous manner. The mode detection circuit 45 first activates the PLL input select line 48 so as to cause the second PLL 44 to adjust its second input 44b to be designated as the reference signal and a first input 44a to be designated as the feedback signal.

The deactivated clock source select line 49 selects an output signal 44c to be passed through the second PLL line clock source selector 42. The output signal 44c is then inputted into the internal PCI clock tree 43 which provides a clock to all logic and state machines which interface to the PCI bus. This includes data registers, flip flops, and other transmission circuitry that assists in transferring data/address information from the CPU clock domain 31 to the PCI clock domain 41.

The deactivated tri-state gate enable signal 50 disables the tri-state gate 54 so that the second PLL 44 is precluded from transmitting a signal through the PCI_CLK pad 51. Therefore, a second external clock generator 57 is coupled to the low skew external clock driver 58 in order to provide an external PCI bus clock signal to the bus bridge circuit 30, as well as drive the plurality of peripheral devices. The external PCI clock signal is inputted into a PCI_CLK_IN pad 52 which is coupled to the second input 44b of the second PLL 44. As a result, the external PCI bus clock signal is used as a reference signal while the output signal of the second PLL 44 is used as feedback for deskewing purposes.

B. Transmission Circuitry

Since the bridge circuit supports both asynchronous and synchronous clocking modes, transmission circuitry including synchronizers and tag units are required to provide efficient and reliable data/address information transfers between the two clock domains.

Figure 8:
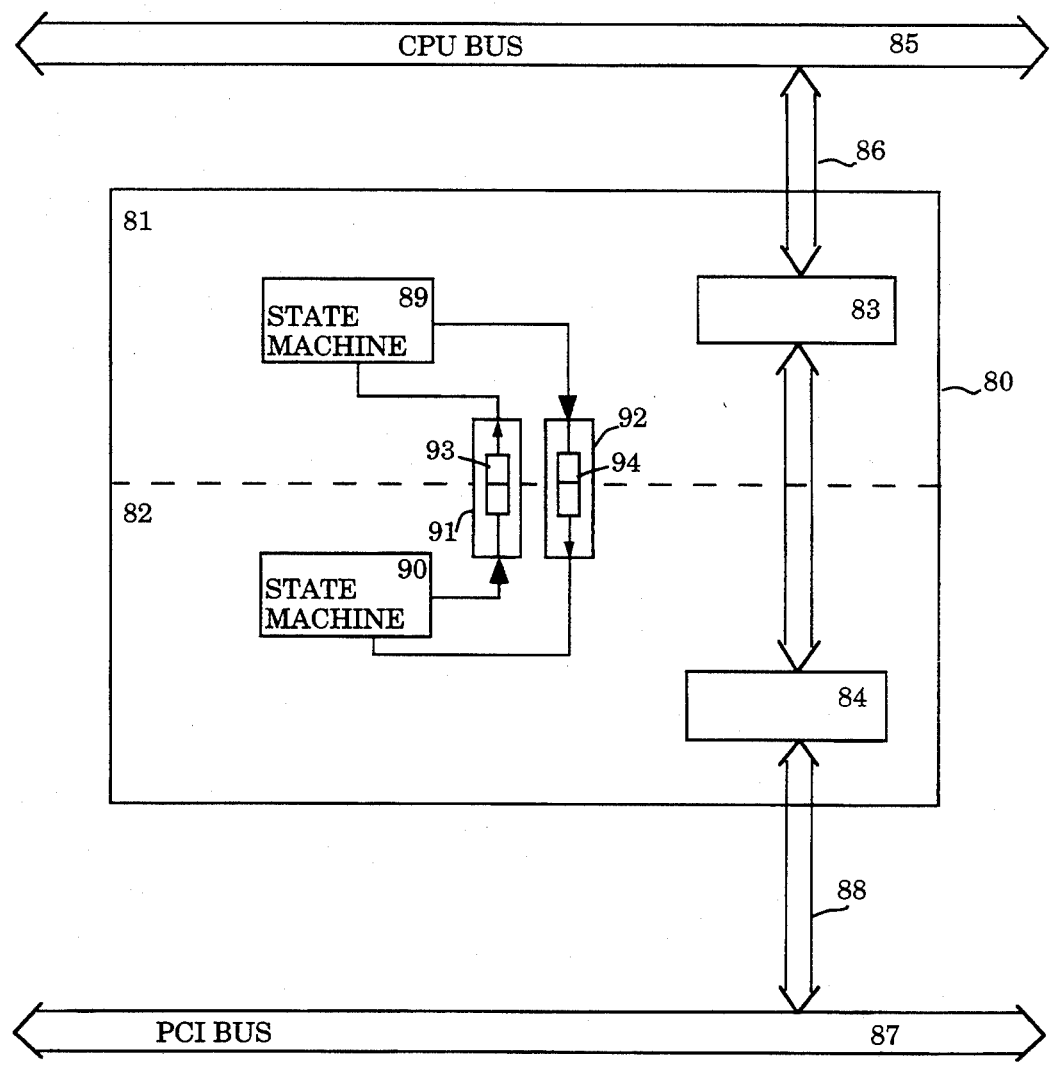
FIG. 8 is a block diagram of the transmission circuitry of the present invention.

Referring to FIG. 8, it illustrates the bridge circuit 80 similar to FIGS. 2-7, wherein the bridge circuit 80 has two clocking domains, such as, for example, a CPU clock domain 81 and a PCI clock domain 82. Both clock domains include a first and second register set 83 and 84 (e.g., a FIFO, LIFO and the like) in order to store data/address information. The first register set 83 is coupled to the CPU bus 85 through a CPU data/address signal line 86 while the second register set 84 is coupled to the PCI bus 87 through a PCI data/address signal line 88. Moreover, each of the two clocking domains includes a state machine 89 and 90 (i.e., a combination of conventional logic) to control the data/address information transfer; a tag unit 91 and 92 to synchronize data/address information transfers between the first and second register sets 83 and 84 located in different clock domains; and a synchronizer 93 and 94 incorporated within the tag units 91 and 92 respectively, in which each synchronizer is used to enable data/address information to be transferred from one clock domain to another.

Figure 9:
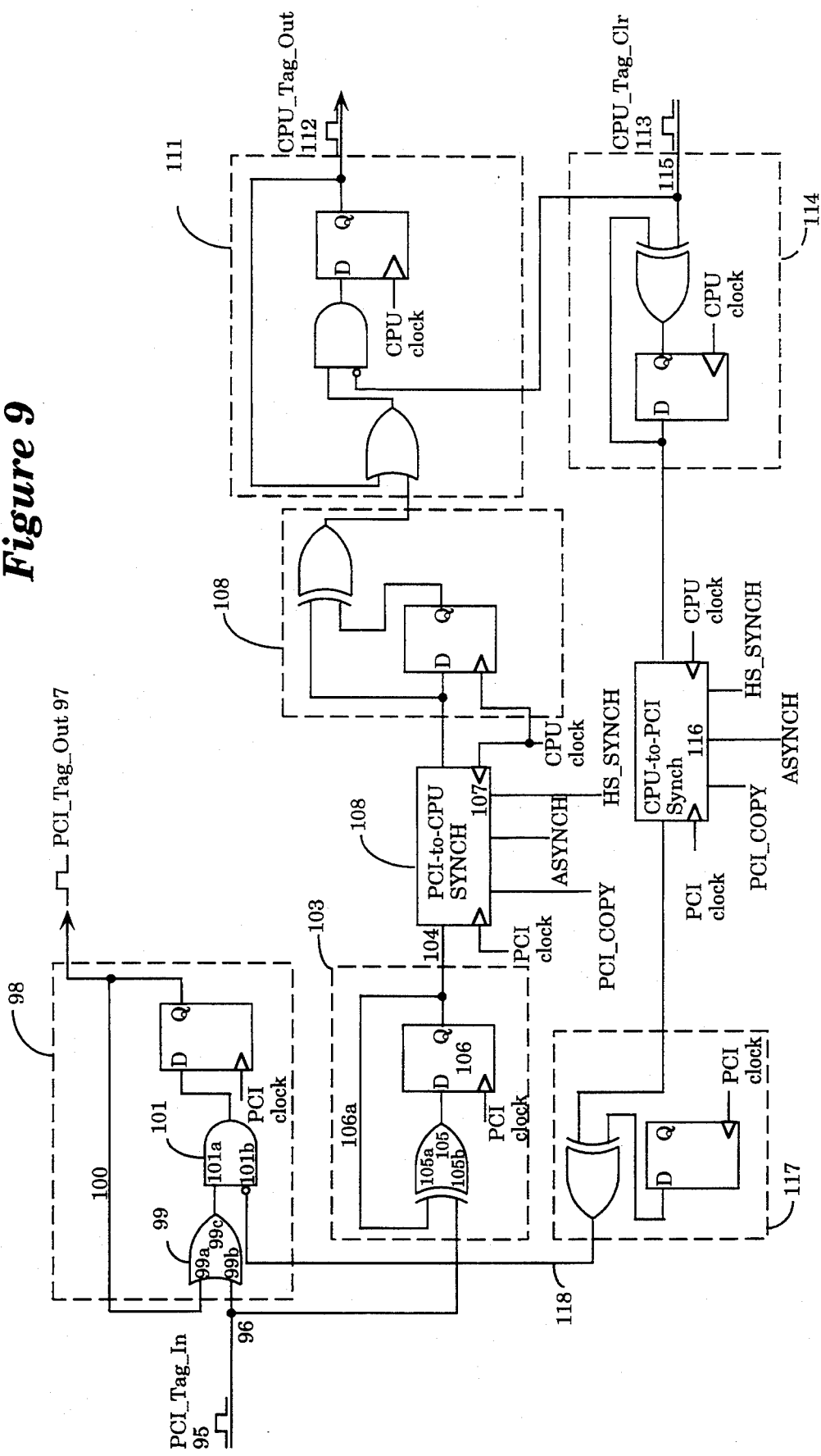
FIG. 9 is a circuit diagram of a PCI-to-CPU tag unit utilized in the transmission circuitry.

In performing data/address information transfers from the PCI clock domain 82 to the CPU clock domain 81, a PCI-to-CPU tag unit 91 is employed. The PCI-to-CPU tag unit 91 can be characterized as a register which indicates whether the data/address information is valid and ready for transfer from the PCI clock domain 82 to the CPU clock domain 81. The PCI-to-CPU tag unit 91 is set in the PCI clock domain 82 and cleared in the CPU clock domain 81 as illustrated in FIG. 9.

When a predetermined event occurs, such as data/address information being stored in the second register set 84, a PCI_Tag_In signal 95 is asserted by the state machine 90 on the PCI__Tag_In signal line 96 for one PCI clock cycle, resulting in an active output signal (the "PCI_Tag_Out signal") 97 being outputted from a PCI_Tag_Out buffer 98 one PCI clock cycle later. The PCI_Tag_Out signal 97 indicates to the state machine 90 that certain registers within the second register set 84 are being used.

The PCI_Tag_Out buffer 98 includes a dual-input OR gate 99, wherein a first input 99a is coupled to the PCI_Tag_In signal line 96 while a second input 99b is coupled to the output of the PCI_Tag_Out buffer 98 through a feedback signal line 100. An output signal 99c of the OR gate 99 is coupled to a first input 101a of a dual-input AND gate 101. A second input 101b of the AND gate 101 is invertedly coupled to an output signal line 102 from a PCI_Clr buffer 117 (discussed below). The output of the AND gate 100 is coupled to a D-input of a first D-type flip flop which activates the PCI_Tag_Out signal 97 one PCI clock cycle after the PCI_Tag_In signal 95 is asserted.

The PCI_Tag_In signal line 96 is further coupled to a PCI_Data_In buffer 103 which generates a PCI__Data_In transition signal on the PCI_Data_In signal line 104 to indicate a transition from a previous state to an opposite state. The PCI_Data_In buffer 103 includes an exclusive OR gate 105 and a second D-type flip-flop 106, wherein a first and second inputs 105a and 105b of the exclusive OR gate 105 are coupled to the PCI_Tag_In signal line 96 and an output signal 106a of the second D-type flip-flop 106, respectively. As a result, the PCI_Data_In transition signal indicates a state change (an occurrence of a pulse) in the PCI_Tag_In signal line 96.

The PCI_Data_In transition signal propagates through a PCI-to-CPU synchronizer 107 into a state detection buffer 108 which monitors the output of the PCI-to-CPU synchronizer 107 for state changes in a manner similar to the PCI_Data_In buffer 103. Upon detection of the PCI_Data_In transition signal, the state detection buffer 108 signals a CPU_Tag_Out buffer 111 to generate an active CPU_Tag_Out signal 112 indicating that there exists data/address information within the second register set 84 as shown in FIG. 8.

Thereafter, referring back to FIG. 8, the state machine in the CPU clock domain 90 performs an appropriate response to the predetermined event, e.g., transferring data between clock domains, placing data on the CPU bus, etc. Then, the CPU state machine 90 transmits an active CPU_Tag_Clr signal 113 into the CPU_Tag_Clr buffer 114 through a CPU_Tag_Clr signal line 115 in order to deactivate the CPU_Tag__Out signal 112 on the next clock cycle. Similar to the operations on the data/address path from the PCI__Data_In Buffer 103 to the CPU_Tag_Out buffer 111, the CPU_Tag_Clr buffer 114 generates a state change by activating a CPU_Tag_Clr signal 113 for one-clock cycle which propagates through a CPU-to-PCI synchronizer 116 and into the PCI_Clr buffer 117. The PCI_Clr buffer 117 detects the transition change and as a response, clears the PCI_Tag_Out buffer 98 by generating a PCI_Clr signal for one PCI clock cycle on the PCI_Clr output signal line 118 to indicate that the second register set 84 is again available.

Figure 10:
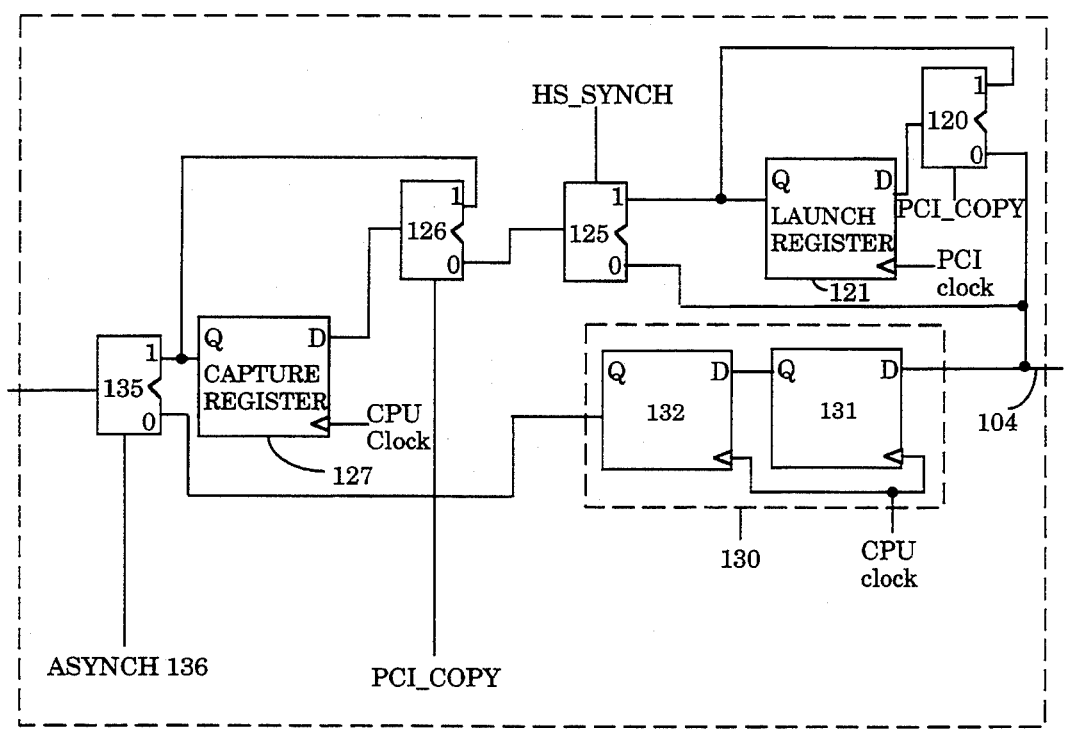
FIG. 10 is a circuit diagram of a PCI-to-CPU synchronizer incorporated within the PCI-to-CPU tag unit illustrated in FIG. 9.

As illustrated in FIGS. 10-11, the PCI-to-CPU synchronizer 107 comprises a plurality of flip-flops and multiplexors coupled together so that data/address information from the PCI clock domain can be transferred to the CPU clock domain while in either synchronous or asynchronous mode, depending on which mode is detected at initialization or after reset of the bridge circuit. The PCI-to-CPU synchronizer 107 receives a PCI_Data_In transition signal through the PCI_Data_In signal line 104 to indicate that a particular event has occurred, such as data/address information being placed within the second register set 84.

The PCI_Data_In signal line 104 is coupled to a first multiplexor 120, a second multiplexor 125 and a conventional synchronizer 130 including of a pair of cascaded D-type flip-flops 131 and 132. If operating in asynchronous mode, a portion of the PCI-to-CPU synchronizer 107 of interest is the conventional synchronizer 130 having the pair of cascaded D-type flip-flops 131 and 132. The pair of cascaded flip-flops 131 and 132 delays the PCI_Data_In transition signal by two CPU clock cycles and sends the delayed PCI_Data_In transition signal into a fourth multiplexor 135. The delayed PCI_Data_In transition signal is selected by an Asynchronous select signal line ("ASYNCFI") 136 to be outputted from the PCI-to-CPU synchronizer 107.

Figure 11A:
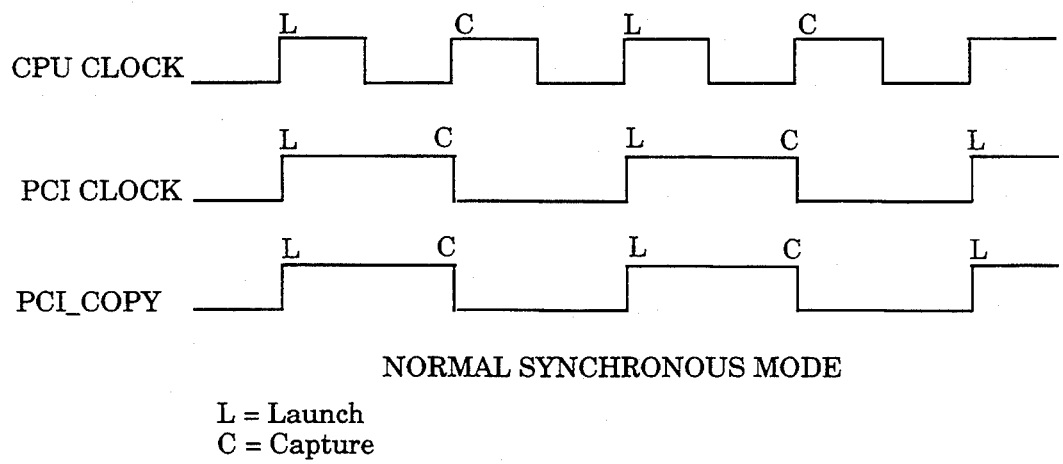
FIG. 11 is a timing diagram illustrating when data/address information is updated, and sampled between the two clock domains.

If operating in a synchronous mode, even though the PCI clock is derived from the internal CPU clock, synchronization is needed to substantially eliminate skew associated with the clock edges of both clocks which could result in a set-up and hold time violation. In the PCI-to-CPU synchronizer 107, there exists two types of synchronous operations; namely, regular and high speed. In regular synchronous operations where the PCI clock is not identical but is harmonically related in frequency to the internal CPU clock, attention is focused on the PCI_Data_In transition signal directly inputted into the second multiplexor 125. The PCI_Data_In transition signal is immediately passed therefrom into a third multiplexor 126. The third multiplexor 126 is controlled by a buffered, synchronous copy of the internal PCI clock (referred to as the "PCI_COPY") which is generated by a clock generator. The PCI_COPY signal selects the PCI_Data_In transition signal to be inputted into a capture register 127 on a rising edge of the internal CPU clock whenever PCI_COPY is "high". The capture register 127 being clocked by the internal CPU clock captures data on the rising edge of the internal CPU clock which occurs approximately during a falling edge of the PCI clock as shown in FIG. 11a. Such mechanism is organized so that capturing is accomplished in the center of PCI clock where data is stable. The PCI_COPY signal is always equal to CPU clock frequency divided by two for normal synchronous mode and high speed synchronous mode.

Figure 11B:
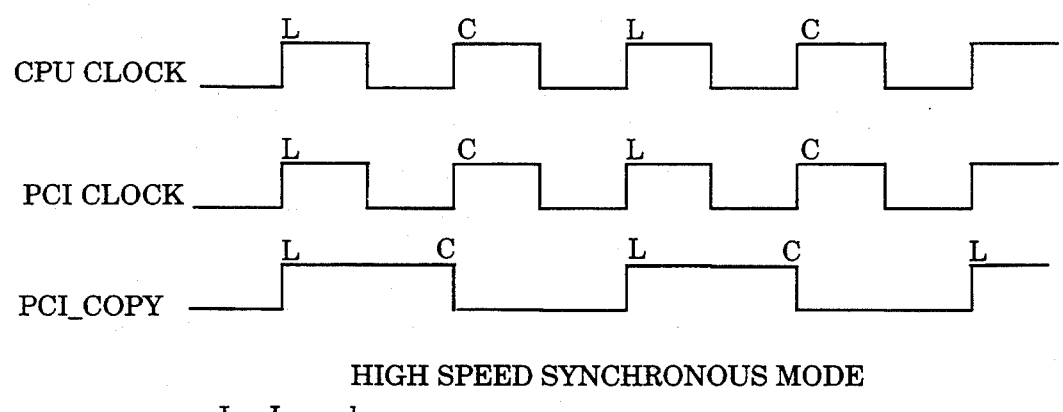

In high speed mode, the PCI_COPY signal is derived from the internal CPU clock. The PCI_COPY signal controls the first multiplexor 120 which, in turn, controls a launch register 121 so that the launch register 121 is updated on a rising edge of every other clock cycle as opposed to every clock edge as in regular synchronous operations as shown in FIG. 11b. The reason being that as long as the skew is less than one CPU clock cycle, there would not exist an appreciable risk of experiencing set and hold time violations.

Figure 12:
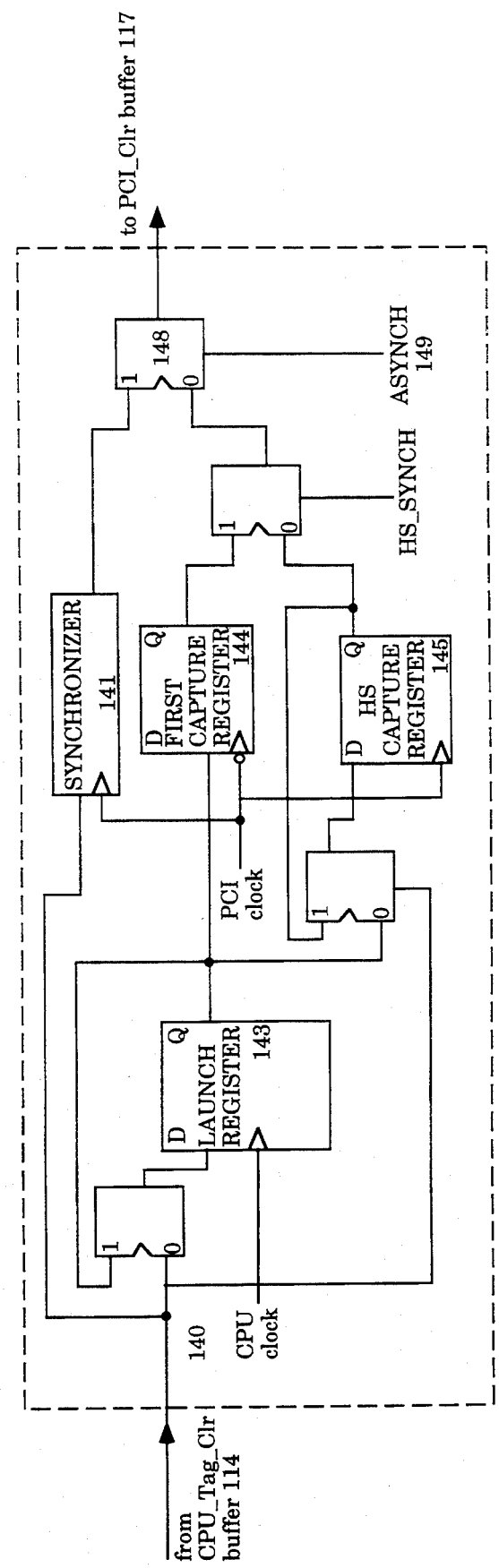
FIG. 12 is a circuit diagram of a CPU-to-PCI synchronizer incorporated within the PCI-to-CPU tag unit illustrated in FIG. 9.

As illustrated in FIG. 12, the CPU-to-PCI synchronizer 116 somewhat similar in construction and general function to the PCI-to-CPU synchronizer 107 in FIG. 10. The CPU-to-PCI synchronizer 116 comprises a plurality of flip-flops and multiplexors coupled together so that data/address information from the CPU clock domain can be transferred to the PCI clock domain. The CPU-to-PCI synchronizer 116 receives a CPU_Data_In transition signal through the CPU_Data_In signal line 140 to indicate that a particular event has occurred, such as data/address information being placed within the first register set 83.

In asynchronous mode, the CPU-to-PCI synchronizer 116 operates in a manner virtually identical to the PCI-to-CPU synchronizer 107. Namely, a conventional synchronizer 141 delays a CPU_Data_In signal by two PCI clock cycles and sends the delayed CPU_Data_In signal into a fourth multiplexor 148. The delayed CPU_Data_In signal is selected by an Asynchronous select signal line 149 to be outputted from the CPU-to-PCI synchronizer 116.

If operating in normal synchronous mode, the CPU-to-PCI synchronizer 116 operates in a manner similar to the PCI-to-CPU synchronizer 107. One difference, however, is that the CPU-to-PCI synchronizer 116 includes a first capture register 144 for normal synchronous modes and a second capture register 145 for high speed. Moreover, instead of the PCI clock signal controlling the capture process, the PCI clock (and its inverted output) controls the capture process.

Similar to the timing diagram in FIG. 10, in normal synchronous mode, data/address information is launched by a first launch register 143 and captured by the first capture register 144 on a falling edge of the PCI clock. This is due to the fact that the first capture register 144 is clocked by an inverted PCI clock. In high speed applications, however, the data/address information is launched and captured on successive PCI clock cycles.

Figure 13:
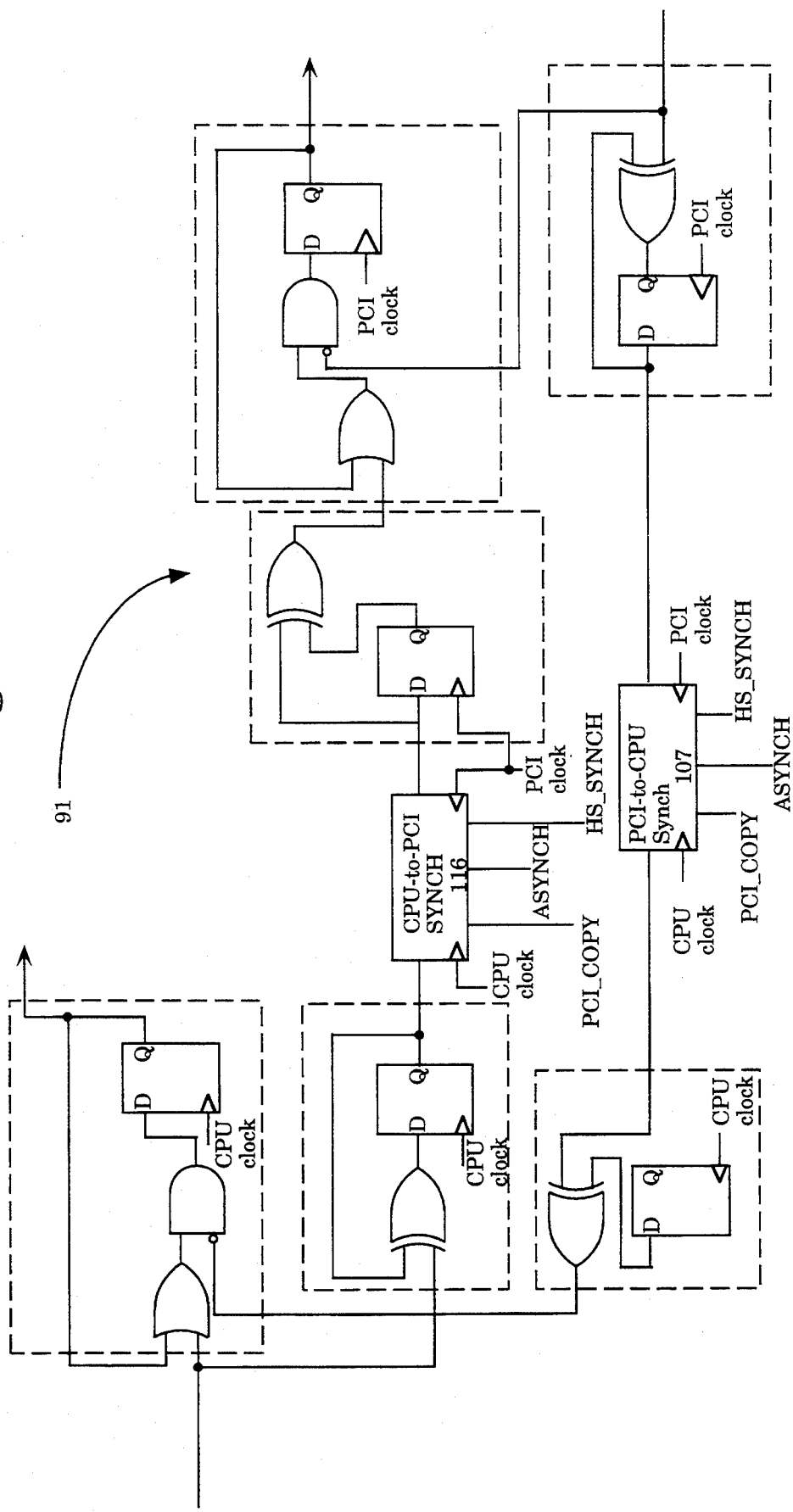
FIG. 13 is a circuit diagram of a CPU-to-PCI tag unit utilized in the transmission circuitry.

In performing data/address information transfers from the CPU clock domain 81 to the PCI clock domain 82, a CPU-to-PCI tag unit 92 is employed. The CPU-to-PCI tag unit 92 operates in a manner similar to the PCI-to-CPU tag unit 91 illustrated in FIG. 9 except that the origin domain is the first domain and not the second domain. Moreover, the structure of CPU-to-PCI tag unit is virtually identical to the CPU-to-PCI tag unit 92 except that the synchronizers 93 and 94 as well as the CPU and PCI clock inputs are exchanged respectively as illustrated in FIG. 13.

The present invention described herein may be designed using many different circuit designs. While the present invention has been described in terms of various embodiments, other embodiments may come to mind to those skilled in the art without department from the spirit and scope of the present invention. The invention should, therefore, be measured in terms of the claims which follow.

What is claimed is:

1. A circuit enabling information to be accurately transferred between a first bus and a second bus, a first portion of the circuit being coupled to the first bus and clocked by a first reference input clocking signal and a second portion of the circuit being coupled to the second bus and clocked by a second reference input clocking signal, the circuit comprising:

first generating means for generating a first clock signal based on the first reference input clocking signal;

second generating means for generating a second clock signal based on the second reference input clocking signal, the second generating means, coupled to the first generating means, operating in one of two modes being a synchronous mode and an asynchronous mode, wherein during the synchronous mode, the second reference input clocking signal is a divided first clock signal having a frequency less than the first clock signal and during the asynchronous mode, the second clock signal is based on a clock supplied by an external clock source; and transfer means for transferring information between the first and second buses under control of the first clock signal and the second clock signal.

2. The circuit according to claim 1, wherein the first generating means includes a phase-locked loop receiving as input the first clock signal and the first reference input clocking signal as a reference signal in order to minimize skew between the first clock signal and the first reference input clocking signal.

3. The circuit according to claim 2, wherein the first generating means further includes a signal divider coupled to an output of the phased-lock loop to produce the divided first clock signal.

4. The circuit according to claim 2, wherein said first and second generating means are clocked by (i) a first external clock generator and (ii) the external clock source being a second external clock generator being coupled to a low skew external clock driver, respectively.

5. The circuit according to claim 3, wherein the second generating means includes detecting means for determining whether the circuit is operating in the synchronous mode and alternatively operating in the asynchronous mode;

selecting means for selecting the divided first clock signal during the synchronous mode and the second clock signal during the asynchronous mode the selecting means being coupled to and controlled by the detecting means; and means for minimizing skew between the second clock signal and the second reference clocking input signal, the means for minimizing skew being coupled to said detecting means.

6. The circuit according to claim 5, wherein the detecting means includes a mode detection circuit monitoring a voltage level on an I/O clock pad of the circuit, wherein the voltage level above a predetermined level denotes one of the synchronous and asynchronous modes and the voltage level below the predetermined level denotes the other of the synchronous and asynchronous modes.

7. The circuit according to claim 6, wherein the mode detection circuit detects the synchronous mode when a pull-up resistor is coupled to the I/O clock pad.

8. The circuit according to claim 7, wherein the mode detection circuit detects the asynchronous mode when a pull-down resistor is coupled to the I/O clock pad.

9. The circuit according to claim 6, wherein the mode detection circuit is coupled to (i) a tri-state gate directly coupled to the I/O clock pad, (ii) the selecting means and (iii) the means for minimizing skew through a first, a second and a third select lines, respectively.

10. The circuit according to claim 9, wherein upon detection of the asynchronous mode by the mode detection circuit, the mode detection circuit activates the first select line coupled to the tri-state gate to prevent the second clock signal from being externally outputted through the I/O clock pad.

11. The circuit according to claim 10, wherein upon detection of the asynchronous mode by the mode detection circuit, the mode detection circuit prevents the selecting means from outputting the divided first clock signal.

12. The circuit according to claim 5, wherein the selecting means includes a multiplexer having a plurality of inputs and one output, a first of the plurality of inputs being coupled to an output signal line of the first generating means and a second input being coupled to an output signal line of the means for minimizing skew.

13. The circuit according to claim 5, wherein the means for minimizing skew includes a programmable phase-locked loop having at least a first and second reversible inputs, wherein the first reversible input operates as a reference signal input when the second reversible input operates as a feedback signal input and the first reversible input operates as the feedback signal input when the second reversible input operates as the reference signal input.

14. The circuit according to claim 13, wherein the programmable phase-locked loop includes a pair of multiplexers having cross-coupled inputs and a common select line for selecting which of said at least first and second reversible inputs represents the reference signal input.

15. The circuit according to claim 13, wherein upon activation of the common select line, the first reversible input becomes the reference signal input of a programmable phase-locked loop and the second reversible input of the programmable phase-locked loop becomes the feedback signal input.

16. The circuit according to claim 1, wherein the transfer means includes first and second storage means for temporarily storing information being transferred between the first and second buses;

means for controlling the information being transferred between the first and second storage means; and means for synchronizing information being transferred between the first and second storage means.

17. The circuit according to claim 16, wherein the synchronizing means includes a first tag unit for synchronizing transfers of information from the first storage means to the second storage means and a second tag unit for synchronizing transfers of information from the second storage means to the first storage means.

18. A circuit enabling information to be accurately transferred between a first bus and a second bus, a first portion of the circuit being coupled to the first bus and clocked by a first reference input clocking signal and a second portion of the circuit being coupled to the second bus and clocked by a second reference input clocking signal, the circuit comprising:

a phase-locked loop for generating a first clock signal via a frequency synchronizing signal line, the first clock signal based on the first reference input clocking signal input into the phase-locked loop;

a signal divider coupled to the frequency synchronizing signal line, for harmonically reducing a frequency of the first clock signal;

a mode detection circuit for detecting a selected mode of operation by monitoring voltage on an I/O clock pad of the circuit, the mode detection circuit being coupled to (i) a logic gate through a first select line, the logic gate preventing the second clock signal from being externally outputted through the I/O clock pad, (ii) a multiplexer through a second select line, the multiplexer having a plurality of inputs and one output, wherein a first of the plurality of inputs being coupled to the frequency [synthesizing-]synchronizing signal line and a second input being coupled to an output of a programmable phase-locked loop, and (iii) the programmable phase-locked loop through a third select line, the programmable phase-locked loop includes at least a first and a second reversible inputs wherein, upon assertion of the third select line, the first reversible input is a reference signal input and the second reversible input is a feedback signal input [inputs changeable upon activation of a select line]; and transmission circuitry including a first storage element for temporarily storing information, a second storage element, coupled to the first storage element, for temporarily storing the information, a first tag unit for synchronizing a transfer of the information. from the first storage element to the second storage element, and a second tag unit for synchronizing transfers of the information from the second storage element to the first storage element.

19. A computer system comprising:

process means for processing information;

peripheral means for performing a predetermined operation on the information;

bus means for enabling the process means to communicate with the peripheral means, the bus means includes a first bus and a second bus; and bridge means for providing clocking to support a transfer of information between the processing means and the peripheral means, the bridge means includes first generating means for generating a first clock signal based on a first reference input clocking signal, second generating means for generating a second clock signal input clocking signal, the second generating means, coupled to the first generating means, operating in one of two modes being a synchronous mode and an asynchronous mode, wherein during the synchronous mode, the second reference input clocking signal is a divided first clock signal having a frequency less than said first clock signal during the asynchronous mode, the second clock signal is based on an external generated second clock domain signal generated by a second clock source, and transfer means for transferring information between the first and second buses under control of the first clock signal and the second clock signal.

20. The computer system according to claim 19, wherein the first generating means includes a phase-locked loop receiving as input the first clock signal and the first reference input clocking signal as a reference signal in order to minimize skew between the first clock signal and the first reference input clocking signal.

21. The computer system according to claim 19, wherein the second generating means includes detecting means for determining whether the circuit is operating in the synchronous mode and alternatively operating in the asynchronous mode;

selecting means for selecting the divided first clock signal during the synchronous mode and the second clock signal during the asynchronous mode the selecting means being coupled to and controlled by the detecting means; and means for minimizing skew between the second clock signal and the second reference clocking input signal, the means for minimizing skew being coupled to said detecting means..

22. The computer system according to claim 21, wherein the detecting means includes a mode detection circuit monitoring voltage level on an I/O clock pad of the bridge means.

23. The computer system according to claim 22, wherein the mode detection circuit is coupled to a (i) tri-state gate directly coupled to the I/O clock pad, (ii) the selecting means and (iii) the means for minimizing skew through a first, a second and a third select lines, respectively.

24. The computer system according to claim 23, wherein upon detection of the asynchronous mode by the mode detection circuit, the mode detection circuit activates the first select line coupled to the tri-state gate to prevent the second clock signal from being externally outputted through the I/O clock pad.

25. The computer system according to claim 23, wherein upon detection of the asynchronous mode by the mode detection circuit, the mode detection circuit activates the second select line coupled to the selecting means to disable the selecting means from outputting the first clock signal.

26. The computer system according to claim 21, wherein the selecting means includes a multiplexer having a plurality of inputs and one output, a first of the plurality of inputs being coupled to an output signal line of the first generating means and a second input being coupled to an output signal line of the means for minimizing skew.

27. The computer system according to claim 21, wherein the means for minimizing skew includes a programmable phase-locked loop having at least a first and second reversible inputs, wherein the first reversible input operates as a reference signal input when the second reversible input operates as a feedback signal input and the first reversible input operates as the feedback signal input when the second reversible input operates as the reference signal input.

28. The computer system according to claim 27, wherein the programmable phase-locked loop includes a pair of multiplexers having cross-coupled inputs and a common select line for selecting which of said at least first and second reversible inputs represents the reference signal input.

29. The computer system according to claim 19, wherein the transfer means includes first and second storage means for temporarily storing information being transferred between the first and second buses;

means for controlling the information being transferred between the first and second storage means; and means for synchronizing information being transferred between the first and second storage means.

30. The computer system according to claim 29, wherein the synchronizing means includes a first tag unit for synchronizing transfers of information from the first storage means to the second storage means and a second tag unit for synchronizing transfers of information from the second storage means to the first storage means.

31. A computer system comprising:

at least one processor for processing information, the at least one processor being coupled to a first bus;

at least one peripheral unit for performing a predetermined operation, the at least one peripheral unit being coupled to a second bus;

a bridge circuit for clocking and coordinating transfer of the information between said first and second bus, the bridge circuit including a first device for generating a first clock signal having minimal skew with respect to a first reference input clocking signal, a mode detection circuit monitoring voltage levels in an I/0 pad of the bridge circuit in order to detect whether the bridge circuit should operate in a synchronous mode or an asynchronous mode;

a second device, coupled to the mode detection circuit, for generating a second clock signal having minimal skew with respect to a second reference input clocking signal, wherein the second device has at least a first and second reversible inputs, wherein the first reversible input operates as a reference signal input and the second reversible input operates as a feedback signal input upon activation of a select line from the mode detection circuit, a multiplexer for selectively outputting one of the first clock signal and the second output signals, the multiplexer being coupled to the first device, the second device and the mode detection circuit, and transmission circuitry including a first storage element for temporarily storing information, a second storage element, coupled to the first storage element, for temporarily storing the information, a first tag unit for synchronizing transfers of the information from the first storage element to the second storage element, and a second tag unit for synchronizing transfers of the information from the second storage element to the first storage element.

32. A method for enabling information to be accurately transferred between a first bus and a second bus through a bus bridge circuit being clocked by a first reference input clocking signal and a second reference input clocking signal the method comprising the steps of:

detecting whether the bridge circuit is supporting asynchronous data transfers between a first and second buses, wherein if the bridge circuit is supporting asynchronous data transfers, then a mode detection circuit performs the following steps:

activates a logic gate to prevent a second clock signal from being externally outputted from the bridge circuit, selects a clock source selector to output the second clock signal, the clock source selector receiving a divided first clock signal and the second reference input clocking signal as inputs, and adjusts a plurality of inputs of a programmable phased-lock loop having a reference input and a feedback input such that the reference input is coupled to a second clock source generating the second reference input clocking signal and the feedback input is coupled to the device providing the divided first clock signal, and if the bridge circuit is supporting synchronous data transfers, then the mode detection circuit performs the following steps:

deactivates the logic gate to allow the second clock signal to be outputted from the bus bridge circuit, selects the clock source selector to output the divided first clock signal, and adjusts the plurality of inputs of the programmable phased-lock loop such that the reference input is coupled to the divided first clock signal and the feedback input is coupled to receive the second clock signal; and inputting the first reference input clocking signal into a first phased-lock loop;

producing a first clock signal from the first phased-lock loop based on the first reference input clocking signal;

dividing the first clock signal;

outputting the divided first clock signal into a multiplexer along with the second clock signal; and providing the first clock signal and second clock signal to data transmission circuits to transfer information between the first and second buses.

33. The circuit according to claim 17, wherein the means for controlling includes at least one state machine.

34. The computer system according to claim 30, wherein the means for controlling includes at least one state machine.

* * * * *

UNITED STATES PATENT AND TRADEMARK OFFICE
CERTIFICATE OF CORRECTION

PATENT NO. : 5,434,996
DATED : July 18, 1996
INVENTOR(S) : Michael D. Bell

It is certified that error appears in the above-indentified patent and that said Letters Patent is hereby corrected as shown below:

In column 1 at line 38 delete " "CPU" " and insert --("PCI")--

In column 3 at line 11 delete "CI/O" and insert --("I/O")--

In column 3 at line 45 delete "I/C)" and insert --I/O--

In column 4 at line 60 delete " "Cn" " and insert --("n"--

In column 9 at line 42 delete "PCI_ _Tag_In" and insert --PCI_Tag_In--

In column 10 at line 61 delete "("ASYNCFI")" and insert --("ASYNCH")--

In column 14 at lines 44-45 delete "[synthesizing-]"

In column 14 at lines 54-55 delete "[inputs changeable upon aactivation of a select line]"

UNITED STATES PATENT AND TRADEMARK OFFICE
CERTIFICATE OF CORRECTION

PATENT NO. : 5,434,996
DATED : July 18, 1996
INVENTOR(S) : Michael D. Bell

Page 2 of 2

It is certified that error appears in the above-indentified patent and that said Letters Patent is hereby corrected as shown below:

In column 14 at line 62 delete "information." and insert --information--

Signed and Sealed this

Third Day of December, 1996

Attest:

BRUCE LEHMAN

Attesting Officer

Commissioner of Patents and Trademarks